May 2, 1944.   H. COATES ET AL   2,348,058
APPARATUS FOR CONTROLLING THE MAXIMUM DEMAND OF ELECTRIC POWER-LOADS
Filed May 16, 1942   9 Sheets-Sheet 8

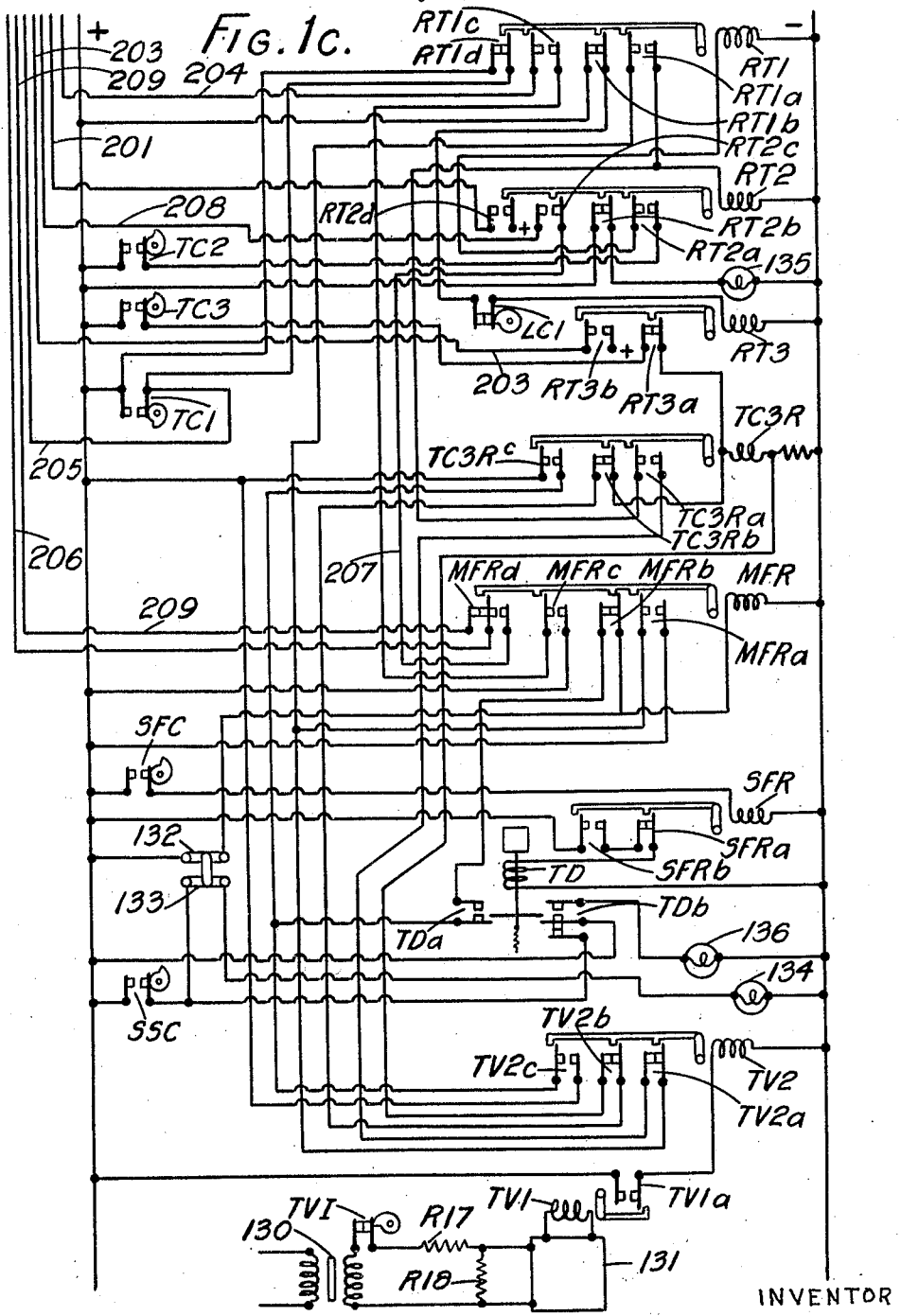

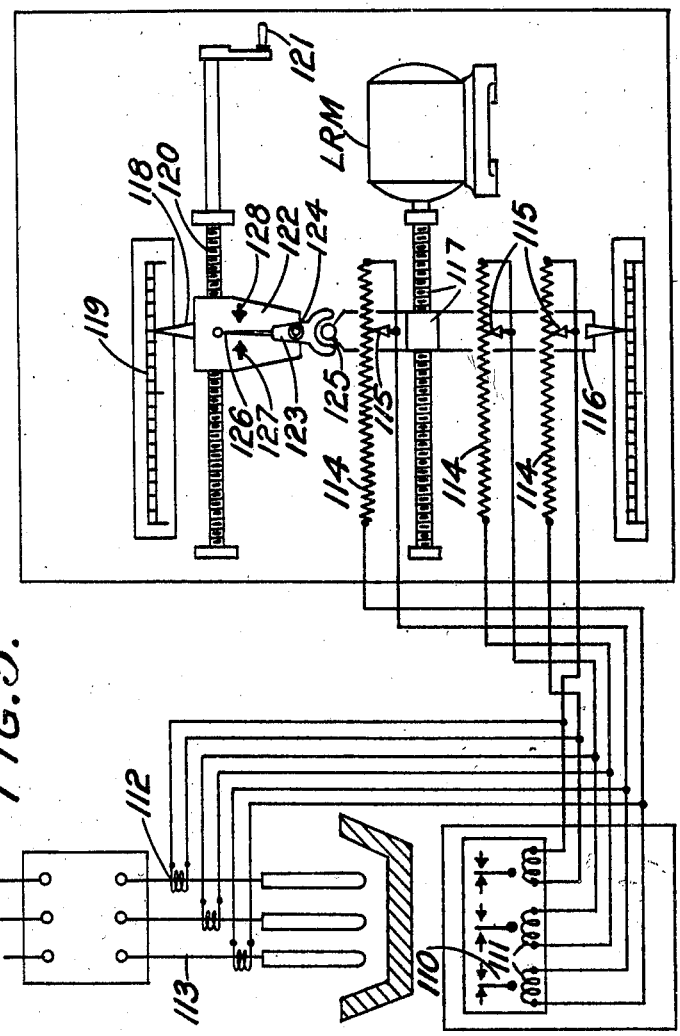

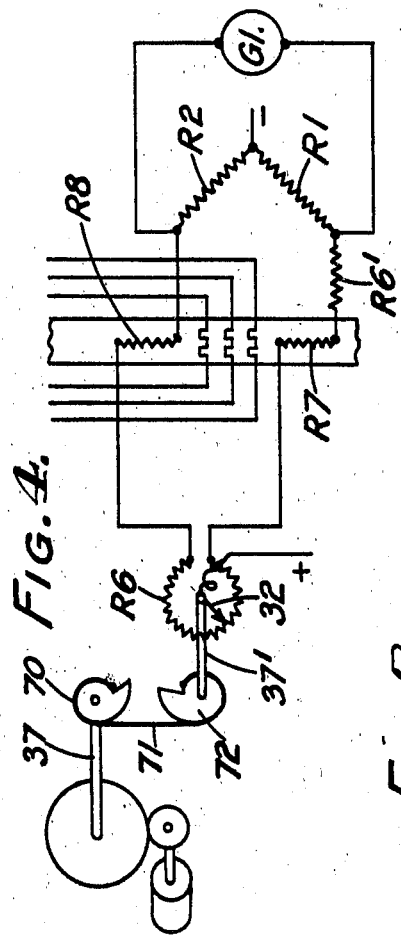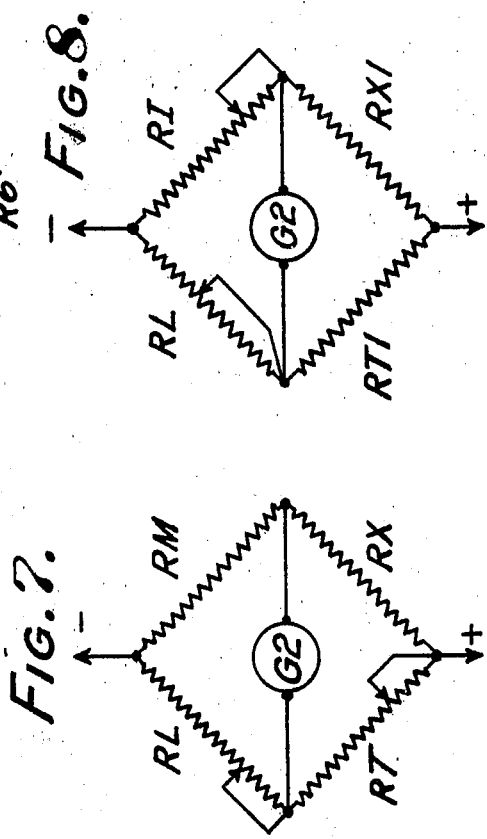

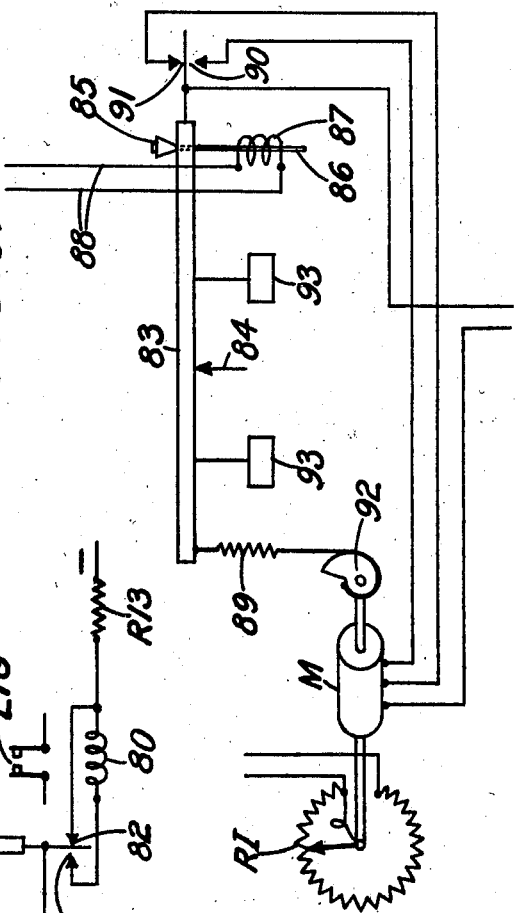

Inventors:
H. Coates and
B. A. Vuille
By Young, Emery, Thompson
Attorneys

May 2, 1944.  H. COATES ET AL  2,348,058
APPARATUS FOR CONTROLLING THE MAXIMUM DEMAND OF ELECTRIC POWER-LOADS
Filed May 16, 1942  9 Sheets-Sheet 9

Inventors:
H. Coates and
B. A. Vuille
By Young, Emery & Thompson
Attorneys

Patented May 2, 1944

2,348,058

UNITED STATES PATENT OFFICE 2,348,058

APPARATUS FOR CONTROLLING THE MAXIMUM DEMAND OF ELECTRIC POWER-LOADS

Henry Coates and Bernard André Vuille, Watford, England, assignors to Watford Electric & Manufacturing Company Limited, Watford, England, a company of Great Britain Application May 16, 1942, Serial No. 443,326
In Great Britain August 9, 1940

20 Claims. (Cl. 171—97)

This application corresponds to the application of Henry Coates, Bernard Andre Vuille and Watford Electric & Manufacturing Company Limited, Serial No. 12,807/40, which was filed in Great Britain on August 9, 1940.

This invention relates to apparatus for controlling the maximum demand of an electric power-load. It is the usual practice for an electric supply authority to place a limit on the electric energy that a large consumer may consume during each of a succession of periods in order to improve the load factor on the electric generating plant. Each of these periods will hereinafter be referred to as a "metering period" and is usually of the order of thirty minutes. The maximum energy that the consumer is permitted to consume in each metering period will hereinafter be referred to as the "maximum demand MD." The load which, if maintained constant over the whole of a metering period, will produce the maximum demand will hereinafter be referred to as the "instantaneous maximum demand $md$." The supply authority employs a meter, hereinafter referred to as the "maximum demand meter" to measure the actual energy taken by the consumer during each metering period and each such amount must not exceed the maximum demand.

The actual load may rise above the instantaneous maximum demand for portions of a metering period provided it is below the instantaneous maximum demand during other portions of that period so that the integration of the load over the whole period is less than the maximum demand. This is illustrated in Figure 16 which shows a fluctuating demand rising above and falling below the instantaneous maximum demand $md$ but consuming the same energy during the metering period shown as a steady load $md$. The load shown in this figure may be taken. If, however, the demand had remained at the highest value shown for the remainder of the metering period, it would have been necessary artificially to reduce the actual load below the instantaneous demand $md$ towards the end of the period in order that the total energy taken should not exceed the maximum demand represented by the area under the chain-line. This may be effected by manually reducing the load when the energy consumed, as shown by the maximum demand meter, appears likely to exceed the maximum demand permitted by the supply authority but such manual regulation of the load is open to various objections.

It is known to provide an automatic control of the load which prevents the instantaneous load from rising above the instantaneous maximum demand so that the total energy taken cannot exceed the maximum demand. Figure 17 shows a case in which the demand X is below the instantaneous maximum demand $md$ at the beginning of a metering period and then rise above $md$ towards the end of the period as shown by the upper curve. The control prevents the instantaneous load from rising above the value $md$ during the latter period so that the actual load is as shown by the lower curve. The total energy consumed during the metering period will be less than the maximum demand by an amount represented by the area shown shaded to the left of the figure and, as this area is greater than that between the (upper) demand curve and the (lower) load curve, it would be permissible to allow the instantaneous load to rise above the value $md$ during the latter part of the metering period so as to utilise the maximum demand to the full. This control is satisfactory if the consuming plant can be so controlled that the instantaneous load remains more or less constant and nearly equal to the instantaneous maximum demand. In many plants, however, the load will be less than the instantaneous maximum demand for substantial periods and cannot be raised during these periods while at other periods the plant could take a load in excess of the instantaneous maximum demand and the control just described does not permit of the maximum demand permitted by the supply authority being utilised to the full in such cases.

Broadly the present invention provides an apparatus which operates in accordance with the energy consumed at each point of a metering period, or a function thereof, and which is operative at any time in the period to control the load if the need to do so arises, the load being at no time uncontrolled although, at times, it may be unrestricted. The control of a power-load in accordance with this invention may take various forms all of which are characterised in that the load is under control substantially all the time.

Thus, the present invention comprises apparatus for controlling an electric power-load in an electricity-consuming plant, comprising a device for measuring the energy consumed during each of a succession of metering periods up to each point of each period, means for comparing the energy consumed at each point, or the equivalent constant load, with the energy (the partial maximum demand) which it is permissible for the plant to have consumed at that point, or the equivalent constant load, respectively, to determine which is the greater and control means operable to permit the load to fluctuate so long as the energy consumed, or the equivalent load, is the lesser, but operable at any time in the period to reduce the load when the energy consumed, or the equivalent load, is the greater. The partial maximum demand may be arranged to increase during the metering period in various manners and one manner is that it should increase from zero to the maximum demand at a constant rate equal to the instantaneous maximum demand. At the beginning of the metering period, the load that could be taken would be limited to the instantaneous maximum demand and it would remain so limited throughout the metering period unless it is below the instantaneous maximum demand for a time so that the energy consumed becomes less than the partial maximum demand. When this occurs, the load is unrestricted and can rise to any value required by the plant. As soon, however, as the energy consumed again begins to exceed the partial maximum demand, the load will be reduced to the instantaneous maximum demand until the energy consumed has again become less than the partial maximum demand. It will be seen that the load is initially restricted and that the restriction is removed if the energy consumed becomes less than the partial maximum demand. It is preferable that the load should initially be unrestricted and the limitation of the load should be imposed only when it is necessary to do so. This may be effected by arranging that the partial maximum demand should increase from an initial value at the beginning of each metering period at a uniform rate corresponding to an instantaneous minimum demand by the plant so as to be equal to the maximum demand at the end of the period. The instantaneous minimum demand is the lowest load at which the plant can be maintained in effective operation and is the value below which the load should not be reduced automatically. The load will be unrestricted until the energy consumed becomes greater than the initial value of the partial maximum demand plus the increase in that value to that time and it will then be reduced to the instantaneous minimum demand. At this time, there will be sufficient energy left for the consumption of a load equal to the instantaneous minimum demand to be taken for the remainder of the period and the plant will operate with this load.

The term "equivalent constant load" means the load which will consume the energy to which it is equivalent in the time during which that energy was consumed, or is to be consumed. Since the energy consumed and the partial maximum demand both come into existence in the same period, their equivalent constant loads bear the same relationship to one another as do the energies and it is immaterial whether the comparison is made between the energies or the equivalent constant loads. The term "equivalent energy" will hereinafter be used to mean the energy consumed in a given period at the constant load to which that energy is equivalent. It will be understood that an apparatus in accordance with this invention compares two values and it is largely a matter of definition whether these values represent loads or energies. In this specification the definition providing the simplest explanation of the operation of the apparatus will be adopted in each case.

The apparatus set out above operates to restrict the load when the energy consumed tends to become excessive and so to leave insufficient energy available to complete the metering period. An alternative method of control is to restrict the load when the energy available for consumption without exceeding the maximum demand becomes deficient.

The present invention, therefore, further comprises apparatus for controlling an electric power-load in an electricity-consuming plant, comprising a meter for measuring the energy consumed during each of a succession of metering periods up to each point of each period, means for subtracting the energy consumed at each point from a permissible maximum demand for the whole of a period to determine the energy still available for consumption at that point, means for comparing the available energy, or the equivalent available constant load, with the energy that would be consumed during the remainder of the period at a standard load, or the standard load, respectively, to determine which is the greater, and control means operable to permit the load to fluctuate so long as the available energy, or the equivalent available constant load, is the greater but operable to reduce the load at any time in the period when the available energy, or the equivalent available constant load, is the lesser. With this apparatus the available constant load will initially equal the instantaneous maximum demand but will increase if the average load taken is less than the instantaneous maximum demand and decrease if the average load is greater than the instantaneous maximum demand. When the available constant load is equal to the standard load, there will be just sufficient energy left for the plant to operate at the standard load for the remainder of the metering period and the load is reduced to, or below, the standard load. It is preferred that the standard load should correspond to the instantaneous minimum demand of the plant so that the load can fluctuate without restriction until the available load is reduced to the standard load when the load is reduced to the instantaneous minimum demand at which rate the plant will consume the remainder of the maximum demand by the end of the metering period. If the standard load is equal to the instantaneous maximum demand, the load will be prevented from rising above the instantaneous maximum demand until the available load has risen owing to under consumption of energy at an average rate below the instantaneous maximum demand. It will be apparent that the two apparatus set out above can be adjusted to control the load in identical manners and are equivalent in this respect. The latter form is preferred for various practical reasons as will be explained later.

The rate of increase of the partial maximum demand or the standard load corresponds to the instantaneous minimum demand but is rather higher to allow for the fact that the reduction of the load takes an appreciable time so that the necessity for reducing the load must be anticipated. It is a feature of this invention to provide means for preventing the instantaneous load being reduced below the instantaneous minimum demand so as to prevent a temporary reduction of the load below that level in an attempt to correct for over consumption during the reduction of the load.

The present invention further comprises apparatus for controlling an electric power-load in an electricity-consuming plant, comprising a device for measuring the energy consumed during each of a succession of metering periods up to each point of each period, means for subtracting the energy consumed at each point from a permissible maximum demand for the whole period to determine the energy still available for consumption at that point; a device for measuring the instantaneous load taken by the plant at each point of a metering period, means for comparing the available constant load equivalent to the available energy, or the available energy, with the instantaneous load, or the equivalent energy, respectively, to determine which is the greater, and control means operable, so long as the available load, or the available energy, is the greater, to permit the instantaneous load to fluctuate, but operable to reduce the instantaneous load at any time in the period when the available load, or the available energy, is the lesser. With this arrangement the available load is initially the instantaneous maximum demand but will increase if energy is being consumed at a rate less than the instantaneous maximum demand and vice versa. The load is reduced if it rises above the available energy so that it is restricted at each point of the metering period to a load which will consume the available energy by the end of the metering period. To allow of loads in excess of the instantaneous maximum demand being taken at the beginning of a metering period, there may be provided means operable, during a predetermined initial part of each metering period, to bias the comparison to a predetermined extent in favour of the available load, or the available energy, being the greater so that the available load or energy is initially exaggerated but is reduced to its true value at the end of the initial part of the period. This arrangement imposes a limit above which the load cannot rise during the whole of the metering period unlike the arrangements set out previously which leave the load unrestricted when there is under consumption of energy.

The control tends to become unreliable towards the end of the metering period for reasons which will be explained later. This could be allowed for by providing a margin of safety but it is preferred to divide each metering period into two parts and to arrange the apparatus to operate as explained above during the first and longer part only of the metering period. During the second part of the metering period, the control operates to prevent the instantaneous load rising above the available constant load as determined at the end of the first part of the metering period. The maximum load which may be taken during the second part of the metering period, namely, the available constant load, will depend upon the amount of energy which has been consumed during the first part of the metering period and will be high if the energy consumed on the first part of the period is low and vice versa. It will be seen that the apparatus is making good use of the available energy even during the second part of the metering period and will only fail to use the available energy to the full if the demand is low during the second part of the period.

Accordingly the apparatus may comprise a device for measuring the instantaneous load, means for determining and registering the available energy at the beginning of the second part of the period, or the equivalent available constant load, means for comparing the available constant load, or the available energy, with the instantaneous load or the equivalent energy for the whole of the second part of the period and arranged to control the control means in such manner that it permits the instantaneous load to fluctuate so long as it, or the equivalent energy, is the lesser but reduces the instantaneous load when it, or the equivalent energy, is the greater.

It is desirable to synchronise the present apparatus with the supply authority's maximum demand indicator in order that the metering period of the present apparatus shall correspond closely with that of the supply authority. Otherwise there is a risk that a period of high demand commencing in one metering period and terminating in the next would coincide with one of the supply authority's metering periods. It is therefore, a feature of the invention to provide resetting means for resetting the apparatus at the end of each metering period to a start condition in readiness for another metering period, restarting means operable by an impulse when the apparatus is in its start condition automatically to re-start it in operation and re-start-preventing means operable by the said impulse when the apparatus is not in its start condition to render the apparatus incapable of being re-started automatically and to bring into action means for limiting the load to a safe value. The impulse is derived from the supply authority's maximum demand indicator at the beginning of each metering period so that the apparatus will be automatically re-started at the beginning of each such period and will be prevented from re-starting if it fails to complete its cycle of operations and reset before the beginning of the next metering period. This takes care of the case in which the apparatus stops or is operating too slowly. If the apparatus is operating too fast, it will have to wait for an abnormally long time in its start condition and means may be provided to bring the re-start-preventing means into action if the apparatus has remained in the start condition for more than a pre-determined time so that the apparatus is prevented from re-starting if it is running too fast.

It will be understood that the apparatus does not control the load during the short interval in which it is re-set and re-started at the end of each metering period. Thus the "period" in references herein to "at any time during the period" does not include such resetting and restarting intervals.

Preferably the comparing means comprises two adjustable resistors which are so adjusted that their resistances represent the values to be compared and which are connected in a bridge, and the control means comprises a polarised relay connected across the bridge to be energised thereby when the bridge is unbalanced.

In a preferred arrangement the comparing means comprises the first constant resistor and a second constant resistor, the ratio of whose resistances represents the standard load, a first adjustable resistor whose maximum resistance represents the maximum demand and which is connected to the meter for adjustment to reduce the resistance in circuit by an amount representing the energy consumed, a second adjustable resistor whose maximum resistance represents the duration of a metering period, means for adjusting the second adjustable resistance from its maximum resistance at a uniform rate to zero at the end of the period, which resistors are so connected in a bridge that the bridge will balance when the ratio of the first to the second adjustable resistor equals the ratio of the first to the second constant resistor, and in which the control means comprises a polarised relay connected across the bridge so as to be energised when the bridge is unbalanced owing to the first said ratio being the lesser to bring into action means for lowering the load.

Preferably, when each metering period is divided into two parts, there is provided means operable, at the change-over point at the end of the first part of the period, to disconnect the first adjustable resistor from the energy measuring device so that its resistance remains constant to represent the energy available at the change-over point, means for disconnecting the second adjustable resistor from its adjusting means at the change-over point or, preferably, for replacing it in the bridge by a constant resistor representing the duration of the second part of each metering period and for replacing the first constant resistor in the bridge by a third adjustable resistor that is adjustable by the load measuring device to a resistance representing the instantaneous load.

The present invention also includes various structural features of the apparatus and novel arrangements for regulating the load.

An apparatus in accordance with the present invention will now be described, by way of example only, with reference to the accompanying drawings, in which—

Figures 1a, 1b and 1c together form an electro-mechanical diagram showing the metering and controlling devices of the apparatus as applied to the control of the load in a steel works' plant; Figures 1a and 1b should be arranged side by side with Fig. 1c centrally below them;

Figure 3 shows diagrammatically apparatus for regulating the load on a steel works' plant;

Figures 4, 5 and 6 show respectively three alternative forms of metering devices that can be employed in the apparatus in place of that shown in Figs. 1a and 1b;

Figures 7 and 8 show respectively alternative arrangements of a control bridge shown in Figs. 1a and 1b;

Like reference characters indicate like parts in all the figures of the drawings.

Figure 1A:
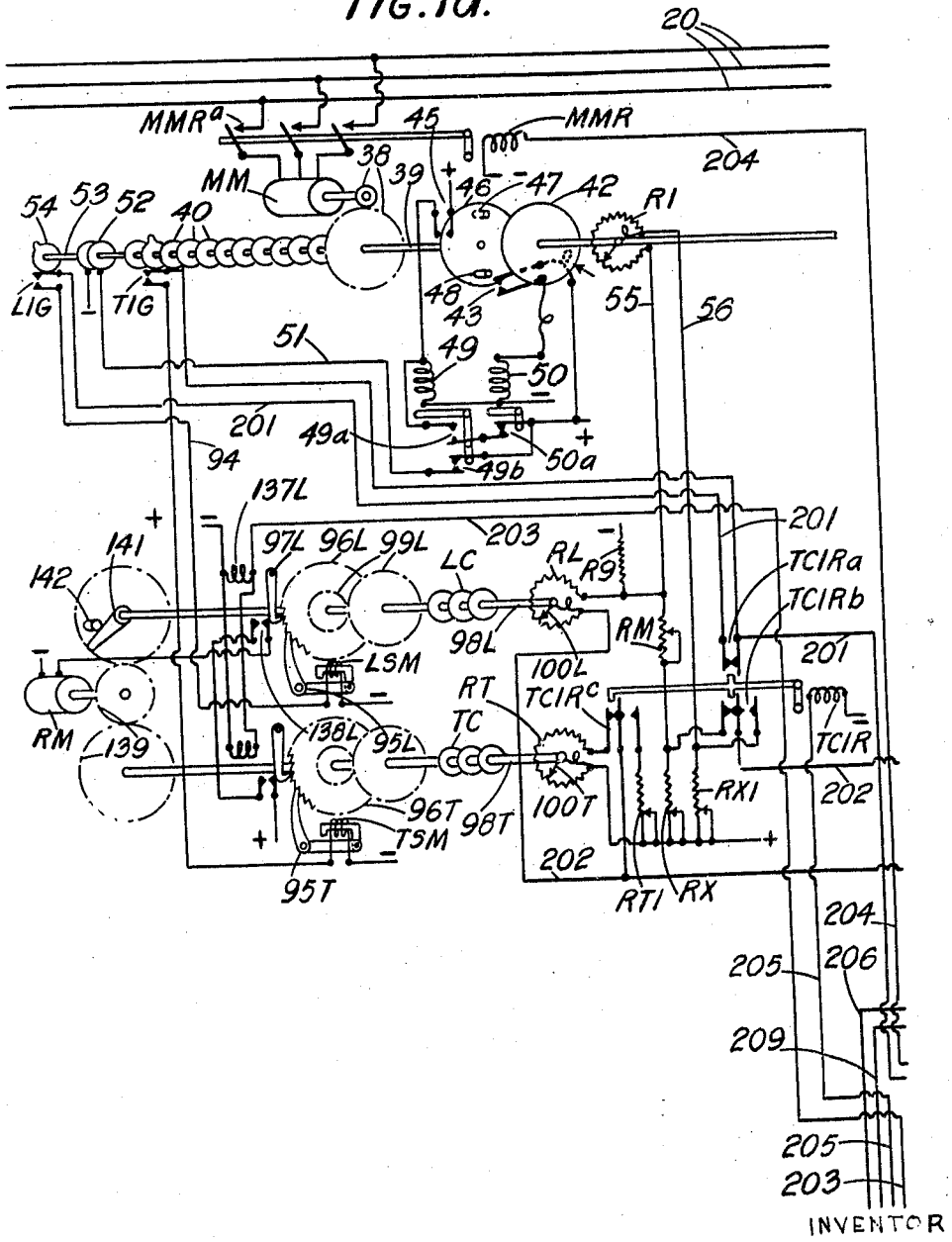
Figure 1B:
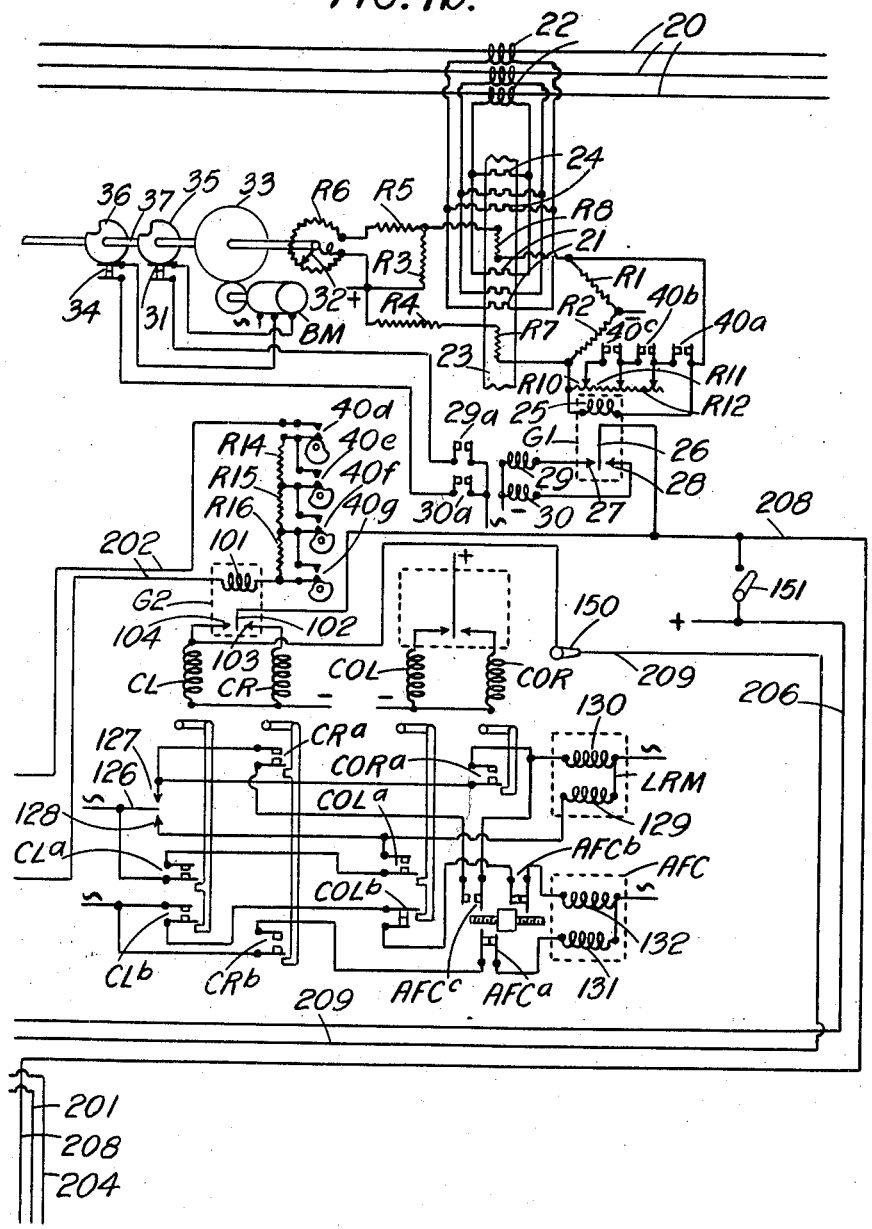

Referring to Figs. 1a and 1b, the steel works' plant is supplied with power by means of lines 20 and the instantaneous load on these lines is measured in the following maner:

Heaters 21 are energised from the lines 20 through current transformers 22 so that the current flowing through each heater 21 is proportional to the current flowing through one of the lines 20. The three heaters are located in a chimney 23 and temperature-sensitive resistors R7 and R8 are located below and above the heaters 21. The air rising in the chimney 23 will be heated by the heaters 21 and the resistors R7 and R8 will be at different temperatures and will have different resistances in consequence. The energy dissipated by the heaters 21 will be proportional to the square of the current flowing over the lines 20 and therefore to the square of the instantaneous load on the lines 20 assuming that the voltage is constant. Assuming the constant rate of air flow up the chimney 23, the temperature differences above and below the heaters 21 will be proportional to the square of the load so that the difference between the resistance of the resistors R7 and R8 would also be proportional to the square of the load. It is, however, desired to measure the load and not the square of the load. The draught in the chimney 23 is produced by the heaters 21 so that the draught increases with the load with the result that the temperature difference will increase at a lower rate than the square of the load. In order to increase this effect, additional heaters 24 are connected in parallel with the heaters 21 and are arranged above the resistor R8 so that they have no effect on the temperature of the resistors R7 and R8 but serve to increase the draught and the rate at which the draught increases with the increasing load. With this arrangement the law relating the difference between the resistance of the resistors R7 and R8 with the load becomes nearly a straight-line law so that the difference in resistance is nearly proportional to the load. Final correction is applied in a manner which will be explained later.

The resistor R7 is connected in series with a constant resistor R4 as one arm of a Wheatstone bridge. The resistor R8 is connected in series with a constant resistor R3 in a second arm of the bridge. A constant resistor R5 and an adjustable resistor R6 are connected in series with one another and in parallel with the resistor R3. The remaining two arms of the bridge are constituted by equal constant resistors R1 and R2. The coil 25 of a galvanometer relay G1 is connected across the bridge. The relay also includes a moving contact 26 and two fixed contacts 27 and 28. When the bridge is in balance the moving contact 26 will be in a central position and disengaged from both the fixed contacts.

If the total resistance of the resistors R3, R5 and R6 is $Rx$ the bridge will be in balance when $$\frac{Rx+R8}{R1}=\frac{R4+R7}{R2}$$

The bridge will thus balance when $$Rx=R4+R7-R8$$

The value of $Rx$ when the bridge is in balance is thus proportional to the difference between the resistance of the resistors R7 and R8 and more or less proportional to the load. The values of the resistors R3, R5 and R6 are so selected that the value of the adjustable resistor R6 which causes the bridge to balance will be proportional to the instantaneous load on the lines 20. In other words, the resistors R3 and R5 provide the final correction, previously referred to, required to determine the load from the heat dissipation by the heaters 21 in accordance with the square of the load.

If the bridge is not balanced, the galvanometer coil 25 will be energised and will move the contact 26 either to engage the fixed contact 27 so as to energise a relay coil 29 or to engage the fixed contact 28 and energise a relay coil 30. The circuits include contacts RT2e and MFRd both of which are closed during the operation of the apparatus as will be explained later.

The relay 29 closes its contact 29a to complete a circuit through limit contacts 31 to energise a motor BM. The motor then drives a moving contact 32 of the resistor R6 through reducing gearing 33. The moving contact 32 will be rotated clockwise to rebalance the bridge by increasing the proportion of the resistor R6 which is short-circuited and this adjustment will continue until the bridge is again in balance. This adjustment occurs if the load on the lines 20 has increased and the displacement of the moving contact clockwise from the position in which none of the resistor is short-circuited is proportional to the instantaneous load on the lines 20. If the load decreases the bridge will become unbalanced in the opposite manner and the relay 30 will be energised to close its contacts 30a and complete a circuit through limit contacts 34 to bring the motor BM into action in the opposite direction. The moving contact 32 will be rotated counter-clockwise to a position corresponding to the reduced load and in which the bridge is again in balance. The contacts 31 and 34 are operated by cams 35 and 36 on a shaft 37 to which the moving contact 32 is also secured. These contacts are opened respectively at the two extreme positions of the moving contact 32 to interrupt the motor circuit and thus limit the movement of the parts.

The apparatus comprises a synchronous motor MM which is energised from the lines 20 and which drives a shaft 39 through gearing 38. The shaft 39 makes two revolutions a minute and carries a number of cams 40 which operate cam contacts in accordance with a half-minute cycle.

Cam contacts 40a, 40b and 40c are closed at the beginning of each half-minute cycle so that the resistor R10 is connected in parallel with the coil 25 of the galvanometer relay and reduces the sensitivity of this relay considerably. Consequently, the bridge will have to be substantially out of balance for sufficient current to flow through the coil 25 to move the contact 26 into engagement with the contact 27 or 28. The contacts 40c open at the time shown in Figure 11 so as to connect the resistance R11 in series with the resistance R10. This increases the sensitivity of the galvanometer relay so that the moving contact 26 will engage the contacts 27 and 28 when the bridge is more nearly in balance. Still later the contacts 40b open to increase the resistance in parallel with the coil 25 and the sensitivity of the relay. Finally, just before the end of each half-minute cycle, the contacts 40a open and the galvanometer relay has its maximum sensitivity so that the contact 26 will be moved to engage the contact 27 or 28 when the bridge is only slightly out of balance. It will be apparent that the proportion of each half-minute cycle during which the contact 26 has engaged the contact 27 or 28 will depend upon the extent to which the bridge is out of balance since if it is only slightly out of balance, the relay will not be sufficiently sensitive to detect the out of balance until late in the half-minute cycle whereas, if it is seriously out of balance, the relay will detect the out of balance even when it is in a less sensitive condition. The motor BM will thus operate for the whole or a portion of each half-minute cycle depending upon the extent to which the bridge is out of balance and therefore to the amount of adjustment required to bring it into balance.

The coils 29 and 30 are shown as connected directly to the contacts 27 and 28 so as to be energised only through these contacts and the moving contact 26. This arrangement has been shown to simplify the circuits but is not satisfactory in practice since it involves the energisation of the relays through contacts which may only be in very light contact. It is, therefore, preferred in practice to control the motor BM from the galvanometer relay by means of one of the arrangements described in British Patent Specification No. 501,917.

The shaft 37 carries a moving contact 41 of a resistance R1 so that the resistance connected between lines 55 and 56 is proportional to the load on the lines 20. The shaft 39 also drives a disc 42 of an integrating device. A pair of contacts 43 are mounted on the disc 42 and will be adjusted so that their displacement clockwise from a zero position represented by the arrow 44 is proportional to the load. The integrating device also comprises a pair of fixed contacts 45 and a disc 46 which is rotated at constant speed by the shaft 39 to which it is secured. The disc 46 carries a pin 47 which, at the commencement of each half-minute cycle closes the contacts 45 so as to energise a relay coil 49 which closes its contacts 49a to provide a holding circuit for itself including normally closed contacts 50a. The coil 49 also opens contacts 49b in a circuit 51 to an electrically controlled clutch 52. The opening of this circuit causes the clutch to engage and couple the shaft 39 to a shaft 53 which commences to rotate. The disc 46 also carries a pin 48 which closes the contacts 43 once in each cycle. If the contacts 43 are in their zero position, they will be closed at the same time as the contacts 45. Normally however, they will be displaced from their zero position by an amount corresponding to the load. The closing of the contacts 43 will thus be delayed and will follow the closing of the contacts 45 by an interval proportional to the load. The closure of the contacts 43 energizes a relay coil 50 which opens its contacts 50a to de-energize the coil 49 so that the contacts 49a open. The contacts 49b are reclosed to re-establish the circuit 51 with the result that the clutch 52 is disengaged and the shaft 53 comes to rest. The shaft 53 thus rotates for a time in each cycle corresponding to the load during that cycle. A cam 54 on the shaft 53 closes contacts LIG intermittently as it rotates so as to generate a series of impulses. The number of impulses generated during each cycle is dependent upon the time during which the cam 54 is rotating in that cycle and therefore to the load during that cycle. It will be seen that the number of impulses transmitted by the contacts LIG correspond to the load at the moment when the contacts 43 close and this is taken as representing the average load during the cycle. The energy consumed will be equal to this load multiplied by the duration of the cycle and since all the cycles are of equal length the number of impulses transmitted in each cycle will be proportional to the energy consumed in that cycle.

Figure 2:
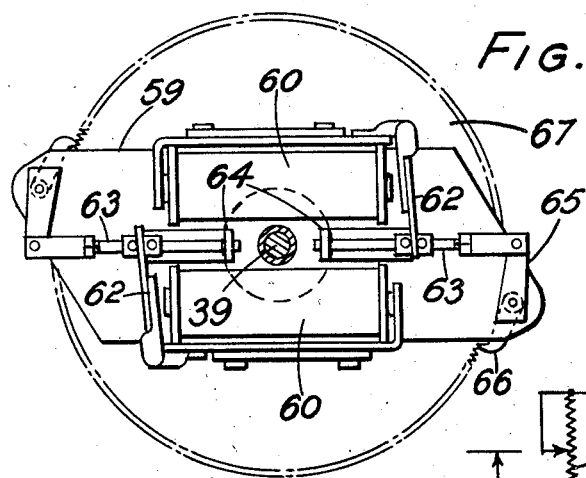
Figure 2 shows a clutch employed in the apparatus.

The clutch 52 is shown in detail in Figure 2 and comprises plate 59 which carries two electromagnets 60. These magnets are connected in the circuit 51 and, when energised, they attract their armatures 62 so as to move rods 63 towards the shaft 39. Each rod is supported at one end in a guide 64 and is pivoted at the other end on an arm 65 which is connected to a pawl 66. Thus, when the magnets 60 are energized pawls 66 are rocked away from a ratchet wheel 67 which is secured on the shaft 53. The shafts 39 and 53 are thus disconnected when the magnets 60 are energized but are reconnected by the pawls 66 being rocked by springs (not shown) and engaging the ratchet wheel 67 as soon as the magnets 60 are de-energised. The shaft 53 will rotate at the same speed as the shaft 39 in the arrangement shown diagrammatically in Figure 1 but in practice it is desirable to incorporate speed-increasing gearing between the shaft 39 and the clutch 52 and between the clutch 52 and the cam 54 so that the cam 54 will rotate at a considerably greater speed than the shaft 39. This allows of the generation of a relatively large number of impulses by the contacts LIG during each cycle so that the number of impulses generated can be closely related to the load.

Figure 4 shows an alternative arrangement of the metering bridge in which the resistors R3, R4 and R5 are omitted together with the heaters 24 and the resistance R6 is connected to the resistances R7 and R8, as shown, with its cursor connected to the positive supply. A resistance R6' is equal to the resistance R6 and is connected between the resistances R1 and R7. If the moving contact 32 divides the resistor R6 into a resistance $x$ in series with the resistor R7 and a resistance $R6-x$ in series with the resistor R8, the bridge will balance when $x+R7+R6'=R6-x+R8$, that is when $2x=R8-R7$. The value $x$ will thus be roughly proportional to the square of the load. In order that the setting of the shaft 37 shall correspond to the load, this shaft is connected to a shaft 37' carrying the moving contact 32 by means of a cam 70, tape 71 and cam 72, a suitable return spring (not shown) being provided to return the moving contact counterclockwise to its zero position. The cams 70 and 72 are so arranged that, as the shaft 37 moves clockwise, it drives the moving contact 32 at an increasing rate and thus compensates for the fact that the setting of the moving contact 32 corresponds to the square of the load instead of to the load.

In other respects the arrangement is as previously described.

In the above description it was assumed that the voltage was constant. If this is not so, it may be preferable to employ a conventional KVAH meter for measuring the load. Such meters have a part 74 (Figure 5) rotating at a speed proportional to the load and a soft iron eccentric 75 is secured on this part. This eccentric co-operates with a permanent magnet 76 which is pivoted at 77 and a glass shield 78 is interposed to prevent contact between the magnet and the eccentric. As the eccentric rotates the air gap between it and the magnet varies, and when it is a minimum, the magnet is attracted and closes contacts 79 to energize a relay 80 over a circuit including the resistance R13. When the air gap again increases, the magnet will cease to be attracted and will be rocked to the right by a spring 81 so as to open the contacts 79 and close the contacts 82 which short-circuit the coil 80. Coil 80 is thus energized once in each rotation of disc 75 and closes the contacts LIG previously referred to as being closed by the cam 54. The closure of these contacts generates impulses at a rate proportional to the speed of rotation of the discs 75 and therefore to the instantaneous load. The number of such impulses occuring in each half-minute cycle of the apparatus will be proportional to the energy consumed in that cycle.

The arrangement just described measures the energy consumed but does not indicate the instantaneous load and this value is required for a reason explained later. The instantaneous load may be measured by a separate meter shown in Figure 6. A beam 83 is pivoted on a fulcrum 84 and carries a yoke 85 at one end. The cores 86 of three solenoids 87 are suspended from this yoke and each solenoid is energised over lines 88 from a current transformer in a different one of the phases of the main supply. It will be seen that the force exerted by the solenoids 87 on one end of the beam is proportional to the load. A spring 89 is attached to the other end of the beam to balance the force exerted by the solenoids. If the load varies the beam will become unbalanced and will rock to close contacts 90 or 91 and bring a motor M into operation in one or other direction. This motor drives a cam 92 one way or the other and the spring 89 is anchored to this cam by means of a tape passing round the cam so that rotation of the cam increases or decreases the tension of the spring 89 to re-balance the beam 83. The motor M also adjusts the moving contact 41 of the resistance R1 which has previously been referred to with reference to Figs. 1a and 1b. Dash-pots 93 are provided to damp out oscillation of the beam.

Each time the contacts LIG close, a circuit is completed from positive through contacts RT2d (Figure 1c) which are closed when the apparatus is operating a line 201 (Figs. 1c, 1b and 1a), normally closed contacts TC1Ra, the contacts LIG, a line 94 and a magnet LSM. The magnet LSM operates a stepping pawl 95L to step a ratchet wheel 96L one step and the ratchet is held in this position by a hold pawl 97L. The ratchet 96L drives the shaft 98L through gearing 99L. Mounted on this shaft are cams LC for operating contacts LC1 (Figure 1c), and LC2 and LC3 (Figure 12) if used, and a moving contact 100L of an adjustable resistor RL. It will be understood that the moving contact 100L is moved clockwise in each half-minute cycle to an extent proportional to the energy consumed during the half-minute cycle. The moving contact 100L is in the position in which the whole of the resistance RL is in circuit at the beginning of each metering period and is gradually adjusted clockwise during the metering period so that the resistance short-circuited at any moment in the cycle is proportional to the energy consumed from the beginning of the cycle up to that point. The total resistance of the resistor RL is proportional to the maximum demand so that the amount of resistance still in circuit is proportional to the energy which is still available for consumption.

One of the cams 40 on the shaft 39 operates contacts TIG intermittently so as to generate impulses at a constant rate. These contacts are in series with the magnet TSM which operate a stepping pawl 95T to drive a shaft 98T through gearing 99T. Shaft 98T carries cams TC for operating certain contacts and a moving contact 100T on a resistance RT. The moving contact 100T will be stepped round at a constant rate so as to short-circuit a portion of the resistor RT proportional to the time that has elapsed from the beginning of a metering period. The total resistance of the resistor RT is proportional to the length of each metering period so that the resistance which is still in circuit at any moment of a metering period corresponds to the time still to elapse to the end of the metering period.

Figure 10:
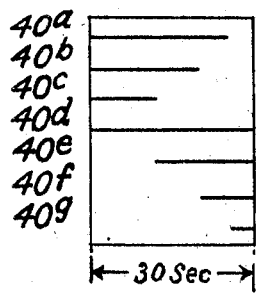
Figures 10 and 11 are timing diagrams for cam contacts in the apparatus.

It will be seen that the resistor RL represents the available energy at any moment while the resistor RT represents the unelapsed time in a metering period. These resistors are connected in a bridge which is completed by resistors RM and RX which are adjustable so that the ratio of $$\frac{RM}{RX}$$

is proportional to a standard load which corresponds to a minimum load at which the steel works plant can be operated, but is rather higher for a reason explained later. The coil 101 (Fig. 1b) of a galvanometer G2 is connected across the bridge through resistances R14, R15 and R16, contacts 40d, line 202, and normally closed contacts TC1Rb (Fig. 1a). At the beginning of each half-minute cycle, the cam contacts 40d, at the time shown in Figure 10, close so as to connect the galvanometer coil 101 across the bridge through the resistances. The galvanometer relay G2 is then in its least sensitive condition. The cam contacts 40e to 40g close in succession to shunt the resistances R14, R15 and R16 in succession and thus increase the sensitivity of the relay. The bridge is shown diagrammatically in Figure 7 from which it will be seen that the bridge will balance when $$\frac{RL}{RT} = \frac{RM}{RX}$$

The ratio $$\frac{RL}{RT}$$

is the available energy at a given point in a metering period divided by the unelapsed time in that period and is thus equal to the load which, if maintained constant for the remainder of the metering period, would exactly absorb all the available energy. This load will be termed the available constant load and the bridge balances when the available constant load is equal to the standard load as represented by the ratio RM:RX. It should be mentioned that the resistors RM and RX are adjusted for a suitable standard load and are left at this adjustment when the apparatus is in operation. If the available load is greater than the standard load, the bridge will be unbalanced in such a manner that a moving contact 102 (Fig. 1b) will engage a fixed contact 103 and complete a circuit to energise a relay CR. The energisation of this relay, as will be explained later, permits the load to fluctuate with the requirements of the plant. If the available load is less than the standard load, the contact 102 will engage the contact 104 and energise a relay CL which operates to lower the load in a manner which will also be explained later.

It will be observed that the relays G2, CL and CR operate jointly as a single control relay. Theoretically only the relay G2 is necessary. The relays CL and CR are necessary in practice because the relay G2 cannot transmit sufficient current through its contacts 102—104.

Figure 9:
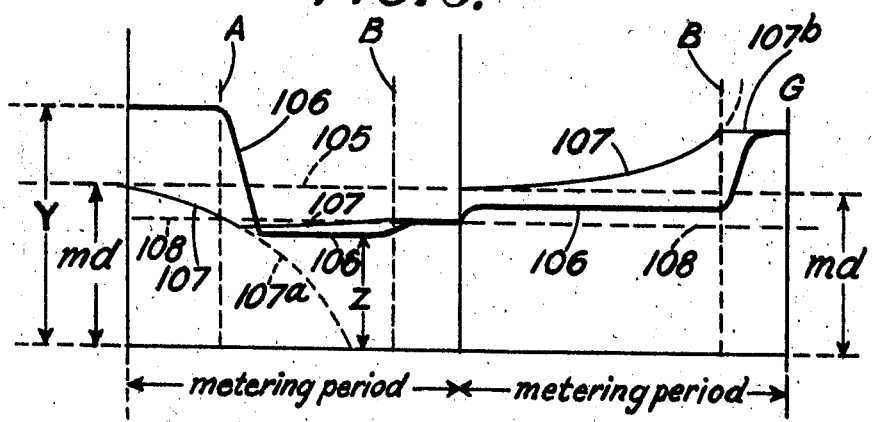
Figure 9 is a diagram showing the load curve of the plant during two metering periods and illustrates the operation of the device.

The operation of the control will be explained with reference to Figure 9 which shows the manner in which the load is controlled during two metering periods. It should be noted that this figure is intended to illustrate the operation of the apparatus and does not show a load condition which would normally occur in practice. In this figure the line 105 indicates the instantaneous maximum demand and the area under this line for one metering period is the total maximum demand. The instantaneous load is indicated by the line 106 and it will be observed that it is at a high value Y at the beginning of the first metering period. Y is considerably in excess of the instantaneous maximum demand so that the whole of the maximum demand would be consumed before the end of the metering period if the load Y were maintained. The available load will decrease as is shown by the line 107 and would eventually become zero at the point where the dotted continuation 107a of this line cuts the base line. The standard load is shown by the lower dotted line 108 and the instantaneous load can remain at the level required by the plant so long as the line 107 representing the available load is above the line 108 representing the standard load. As soon as the line 107 falls below the line 108, that is when the available load becomes less than the standard load, the galvanometer G2 will be energised to close its contacts 102, 104 and energise the relay CL which operates to lower the load. The load will fall to a value Z below which it is prevented from falling by apparatus described later.

If the load had been lowered instantaneously at the time represented by the vertical line A to the value represented by the line 108, the available load and the standard load would have become equal and the bridge would have re-balanced so that no further change of load would have occurred. The plant would then consume the whole of the energy available at the time A at the standard load. In practice, however, an appreciable time is required to reduce the load and during this time the load is in excess of the standard load so that it is necessary to reduce the load below the standard load to the value Z. In other words, the standard load is fixed at a value slightly higher than the minimum load Z, below which it is undesirable to reduce the load under automatic control, in order to allow for the excess energy consumed while the load is being reduced. The available load curve will fall below the standard load and then rise towards it and if the correction for the excess energy consumed is too great, the available load curve will rise above the standard load and thus permit the load to rise to the standard load towards the end of the period, as indicated in Figure 9. The load Z is the instantaneous minimum demand (previously referred to) of the plant.

During the second metering period it is assumed that the load required by the plant remains constant below the instantaneous maximum demand. Owing to this, the available load curve rises and tends towards infinity towards the end of the cycle. It will be apparent that, during the whole of the second metering period, the instantaneous load could be raised since the maximum demand is not being utilised to the full. Towards the end of each metering period the available energy becomes small as compared with the energy which could be consumed through a sudden increase in load so that there is a risk that excess energy would be consumed before the apparatus could operate to reduce the load to the minimum value. Moreover, the values of the resistances RL and RT both become small so that the risk of error in the accuracy to which their ratio is equal to the available load becomes large. The apparatus as thus far described cannot therefore be relied on to control the load during the last five to ten minutes of a thirty minute metering period. The nature of the control is therefore altered at the time B in each metering period so that it prevents the load from rising above the available load at the time B. This available load is represented by the horizontal line 107b in Figure 9 and the load line 106 is shown as rising to this value at the end of the period. It should be noted that the load is not controlled with regard to the instantaneous maximum demand after the time B, but it is instead controlled to the available load which depends upon the amount of energy consumed before the time B and which will be high if the energy consumed has been small, but will be low if the energy consumed has been high but not sufficiently high to cause an automatic lowering of the load.

At the time B in each metering period contacts TC1Rb and TC1Rc (Fig. 1a) are shifted as will be explained later. The contacts TC1Rc connect a resistance RT1 in circuit instead of the resistance RT. The resistance RT1 is adjusted to be proportional to the time still to elapse at the point B of each metering period. The contacts TC1Re disconnect the galvanometer from the resistors RM and RX and connect the galvanometer relay between the resistor R1 and a resistor RX1. The contacts TC1Ra also open so that no further impulses can be given to the magnet LSM and the resistor RL remains in the setting which it assumed at the point B of the metering period. The bridge is then connected as shown in Figure 8 and will balance when $$\frac{RL}{RT1} = \frac{R1}{RX1}$$

Ratio $$\frac{RL}{RT1}$$

corresponds to the available load at the time B of the metering period. Ratio $$\frac{R}{RX1}$$

represents the instantaneous load as indicated by the setting of the moving contact 41 of the resistance R1. If the available load is greater than the instantaneous load, $$\frac{RL}{RT1}$$

will be greater than $$\frac{R1}{RX1}$$

and the galvanometer relay will be energised so as to energise the relay CR (Fig. 1b) and permit the load to rise or fall as required. If the instantaneous load is greater than the available load, the ratio $$\frac{R1}{RX1}$$

will be greater than the ratio $$\frac{RL}{RT1}$$

the galvanometer relay will be energised in the opposite manner and will energise the relay CL which will operate to lower the load until the instantaneous load is again equal to or less than the available load.

It will be seen that the apparatus operates before the point B of each cycle to permit the load to fluctuate as required so long as the available load is greater than the standard load but reduces the load to a minimum value when the available load becomes less than the standard load. If the available load is greater than the standard load at the point B, the apparatus will permit the load to fluctuate below the available load at the time B but it will prevent it from rising above the available load at the time B.

The variation in the sensitivity of the galvanometer G2 during each cycle of the apparatus operates in a similar manner to the variation in the sensitivity of the galvanometer G1 in that the relay CL or CR will be energised for the whole of each cycle, or a proportion of each cycle whose length depends upon whether the available load differs greatly from the standard load, or the instantaneous load after the point B, or is nearly equal to the latter load. This adjustment of the sensitivity thus tends to provide for a rapid automatic reduction of the load when it is running at a high level and to reduce the rate at which the load can be increased if the available load is nearly equal to the standard load and there is a risk that automatic reduction in the load may be required.

It should be noted that the bridge shown in Figure 7 will balance when $$RL = RT \cdot \frac{RM}{RX}$$

RL equals the available energy and $$RT \cdot \frac{RM}{RX}$$

represents the energy which would be consumed at the standard rate during the remainder of the measuring period. Thus it is equally true to say that an automatic reduction in the load occurs when the available energy becomes equal to the energy which would be consumed at the standard rate. It is also true of the bridge arrangement shown in Figure 8 that $$RL = RT1 \cdot \frac{R1}{RX1}$$

that is to say, that the bridge will balance when the available energy at the time B becomes equal to the energy which will be consumed by the instantaneous load during the part of the metering period after the time B. It will be obvious that the apparatus may be arranged to effect a comparison of loads or a comparison of energies and either manner is within the present invention.

The relays CL and CR have been shown controlled directly by the galvanometer G2 but, for the reasons explained previously, they should in practice be controlled in one of the manners described in British Patent Specification No. 501,917, aforesaid. Instead of replacing the resistor RT by the resistor RT1 at the time B of each measuring period, the circuit to the magnet TSM could be interrupted by the contacts TC1Ra so that the adjustment of the resistance RT is stopped when it represents unelapsed time at the change-over point B. The arrangement illustrated is, however, preferred since it enables the shaft 98T to be used to drive cams for timing the termination of the metering period.

Figure 12:
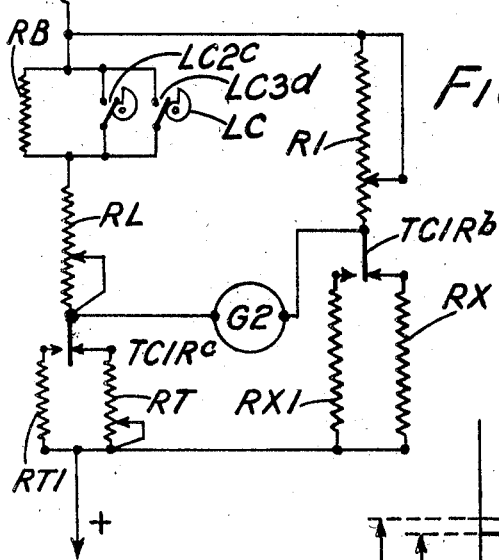
Figure 12 shows an alternative form of control bridge that can replace the control bridge shown in Figs. 1a and 1b.

An alternative method of control consists in preventing the instantaneous load from rising above the available load during the first part of each metering period, the operation during the second part being as previously described. The control bridge would have to be re-arranged, as shown in Figure 12, to operate in accordance with this method. As shown in Figure 12, the resistor RI is connected in circuit during the whole of the metering period and thus replaces the resistor RM during the first part of the period. A boost resistor RB is connected in series with the resistor RL but is short-circuited at a predetermined time in the measuring period. Assuming that the resistor Rb is short-circuited the modified bridge will balance when the available load, represented by the ratio $$\frac{RL}{RT}$$

is equal to the instantaneous load represented by the ratio $$\frac{RI}{RX}$$

Figure 13:
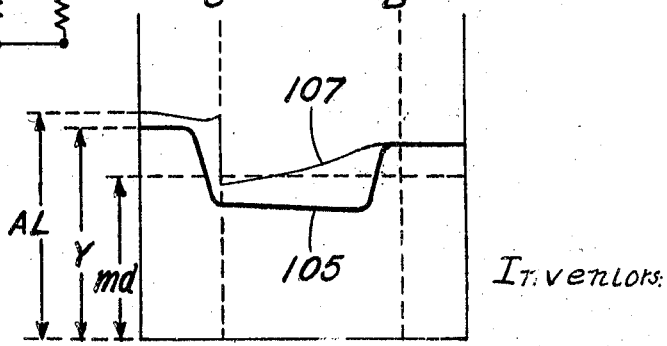
Figure 13 is a diagram showing a load curve when the bridge of Figure 12 is employed.

The instantaneous load can thus fluctuate as required below the available load so long as it is less than the available load but will be reduced, should it rise above the available load, until it is equal to the available load. The effect of the boost resistor RB is to increase the ratio representing the available load by a predetermined amount over the true available load and thus allow of an increased load being taken at the beginning of a metering period. The operation of this arrangement is illustrated in Figure 13. It is assumed that the available load is boosted to the time C and has an initial value AL. The instantaneous load is represented by the line 105 and is initially greater than the instantaneous maximum demand but less than the boosted available load. Since the instantaneous load is greater than the instantaneous maximum demand, the available load will tend to decrease. Just before the time C the instantaneous load is reduced, it is assumed, to a value below md, thus allowing the available load to increase. Later the instantaneous load tends to rise to a value above the available load but is prevented from so doing by the control. Since the plant is not, now, taking more than the available load, the latter will remain constant unless the instantaneous load should again fall. Should the instantaneous load fall again, the available load will tend to rise but, after the time B, will become constant as previously described. The artificial boost at the beginning of the period should be of such size and provided for such a period that, if the whole of the energy made available by this boost is consumed, the available load will be reduced to the minimum value required by the plant so that there is still sufficient energy available to operate the plant at the minimum load. This control does not, however, meet the case where a very heavy load occurs for a short time at the beginning of the period and is followed by a very low load and the control is more empirical than the arrangement described with reference to Figs. 1a and 1b.

The present apparatus is shown as applied to a steel works plant comprising annealing furnaces and an electrode arc furnace. The annealing furnaces are thermostatically controlled so that the load they take is regulated automatically. The annealing furnaces are also controlled by suitable switch gear operated by a motor AFC (Figure 1b) which can be driven in one direction so as to regulate the load taken by the annealing furnaces between a minimum value and a maximum value. The motor AFC exerts an overriding control on this part of the load and determines the load which the annealing furnaces can take although they need not take it if the temperature conditions do not require so high a load. The maximum load taken by the arc furnace can be adjusted by means of a manual control and is also varied automatically. The regulating device for the arc furnace is shown in Figure 3. The load taken by the arc furnace is controlled by a conventional furnace controller 110 including relay coils 111 which are energised by means of current transformers 112 from the supply lines 113 to the arcs so as to maintain a constant load. The three coils 111 are shunted by resistances 114 which can be adjusted by means of moving contacts 115 mounted on a plate 116. By adjusting the moving contacts 115 so as to vary the resistances 114 and the portion of the current diverted from the coils 111, the load can be varied. The furnace controller will adjust the furnace so as to maintain the current through the coils 111 constant so that the actual load will depend upon what proportion of the current from the transformers 112 passes through the coils 111 and what proportion passes through the resistances 114. The plate 116 is adjusted by a nut and screw 117 operated by a load-regulating motor LRM and is moved to the left to raise the load or to the right to lower the load. The load at which it is desired to operate the furnace can be present by adjusting a pointer 118 along a scale 119 by means of a screw 120 operated by a handle 121 or other device. The screw 120 passes through a threaded hole in a plate 122 which has a lever 123 pivoted on it at 124. The lever 123 has a ball and socket or equivalent connection 125 to the plate 116 and carries a movable contact 126. Two fixed contacts 127 and 128 are carried by the plate 122.

When the plate 116 is in the position in which the load actually taken by the furnace is that preset on the scale 119, the parts will be in the position shown in Figure 3 with the contact 126 disengaged both from the contact 127 and the contact 128. If it is desired to set the regulator for a higher load, the plate 122 will be moved to the left and the lever 123 will rock on it so that the contacts 126 and 127 will close. If, on the other hand, it is desired to lower the load, the plate 122 will be moved to the left and the contacts 126 and 128 will close.

Referring to Figure 1b, closure of the contacts 126, 128 completes a circuit to energise a winding 129 of the motor LRM so as to bring that motor into action to move the plate 116 (Figure 3) to the right and lower the load. The motor continues in operation until the contacts 126, 128 open when the load will have been lowered to the preset value. If the arc furnace regulator is preset for a higher load than the actual load taken by that furnace, the contacts 126, 127 will close and complete a circuit through contacts CORa, if these are closed, to energise a winding 130 of the motor LRM so that the motor operates to move the plate 116 to the left until the load has been raised to the preset value. The contacts CORa are closed by a relay coil COR which is energised for all arc furnace loads below a predetermined limit, for example 2800 kva., so that the load can be raised or lowered manually as desired so long as it does not exceed 2800 kva. If the load exceeds 2800 kva., the contacts CORa will be opened so that the load cannot be raised manually although it can still be lowered manually.

Assuming that the relay CR (Figure 1b) is energised permitting the load to fluctuate, contacts CRa and CRb will be closed and a circuit is completed through the contacts CRb and contacts AFCa which are normally closed to energise a winding 131 of the motor AFC. The motor AFC will then operate to raise the load taken by the annealing furnaces. When this motor has raised this load to the maximum, contacts AFCa will be opened by the motor and contacts AFCc will be closed. If, at this time, the load taken by the arc furnace is less than the load preset on the regulator for the arc furnace, the contacts 126 and 127 will be closed and a circuit will be completed through the contacts CRa and AFCc to energise the winding 130 so that the motor LRM will operate to raise the arc furnace load to the preset value.

If the apparatus calls for a reduction in the load, the relay CL will be energised and will close its contacts CLa, CLb. A relay COL is arranged to be energised when the load taken by the electrode furnace is greater than the load at which the relay COR is deenergised, for example is 3000 kva. Thus, if the load taken by the electrode furnace is greater than 3000 kva., contacts COLa will be closed and contacts COLb will be opened. A circuit will then be completed through the contacts CLa and COLa to energise the winding 129 so that the motor LRM will operate to reduce the load taken by the electrode furnace. This reduction will continue, if required, until the load is below 3000 kva., when the contacts COLa will open to de-energise the motor LRM and the contacts COLb will close. A circuit will now be completed through the contacts CLb, contacts COLb and contacts COc to energise the winding 132 of the motor AFC which will operate to reduce the load on the annealing furnaces. The reduction in load will continue until either the contacts CLb open or the contacts AFCb open. The contacts AFCb are opened by the motor AFC when it has reduced the load taken by the annealing furnaces to the minimum value. The load taken by the plant has now been reduced to the minimum value (instantaneous minimum demand) which can be reached under automatic control, although it can be further reduced manually if the load required by the electrode furnace is below 2900 kva., in the example assumed.

It will be seen that the load taken by the electrode furnace can be varied manually provided it does not exceed a predetermined value. If the available load, as determined by the controlling apparatus, is greater than the minimum load, the motor AFC will operate to increase the load taken by the annealing furnaces so as to utilise the excess load. If there is still available load when the annealing furnaces have been regulated to take their maximum load, the contacts AFc will be closed and the load taken by the electrode furnace can be raised manually to utilise the load still available. If the load has to be reduced automatically, the load taken by the electrode furnace is first reduced to the predetermined value and then the load taken by the annealing furnaces is reduced to its minimum value but the load cannot be reduced further under the automatic control of the controlling apparatus, although it can be reduced manually by reducing the load taken by the electrode furnace.

The manner in which the controlling apparatus is started and maintained in synchronous operation will now be described with reference to Figure 1c. The electric supply Authority will install a maximum demand meter which incorporates a timing device that resets the meter every half-hour so that the meter measures the consumption during each half-hour metering period separately. The timing device includes a pair of contacts TVI which open for about forty seconds at the end of each half-hour metering period so as to interrupt a circuit which is fed by a transformer 130 and includes resistances R17, R18. A light relay coil TV1 is fed from this circuit by a rectifier 131 connected across the resistance R18 and is de-energised when contacts TVI open. This coil normally holds its contacts TV1a closed to energise a relay TV2 but the latter relay is de-energized by the opening of the contacts TV1a at the end of each half-hour metering period. The de-energisation of this relay constitutes the synchronising signal by which the starting of the apparatus is controlled and it will be noted that it is of the nature of a negative impulse constituted by the momentary interruption of a circuit rather than an impulse constituted by the momentary completion of a circuit. In order to start the apparatus coupled switches 132, 133 are closed, as shown. The switch 133 completes a circuit through normally closed contacts TDd and an amber light 134 to indicate that the apparatus is being started. The switch 132 energises a relay MFR which closes contacts MFRa, MFRb and MFRc. At this stage a relay coil RT3 will be energised if contacts LC1 are closed. These contacts are operated by a cam LC on the shaft 98L and will be closed unless this shaft is in its proper start position in which the cursor 100L is in its extreme anticlockwise position. The coil RT3 closes contacts RT3b (Figure 1c) to complete a circuit over a line 203 (Figs. 1c and 1a) to energise two magnets 137L and 137T which pull off the holding pawls 97L and 97T and thereby close contacts 138L and 138T. The closure of these contacts completes a circuit to reset motor RM which through gearing 139 drives the shaft 98T back to its starting position. The motor RM also drives a gear wheel 140 rotatable on the shaft 98L. An arm 141 is secured on its shaft and is picked up by a pin 142 on the gear wheel 140 so as to restore the shaft 98L to its starting position. It should be mentioned that the shaft 98T is stepped at a constant rate while the shaft 98L is stepped round at a rate which varies with the load but which is arranged not to exceed the rate at which the shaft 98T is stepped round even when the plant is taking the maximum load of which it is capable. Thus the pin 142 will always be ahead of the arm 141 during the stepping of the shafts 98L and 98T.

When the shaft 98L reaches its start position the contacts LC1 (Fig. 1c) will open to de-energise the relay RT3 so that the holding pawls are restored and the reset motor RM will be de-energised.

Figure 11:
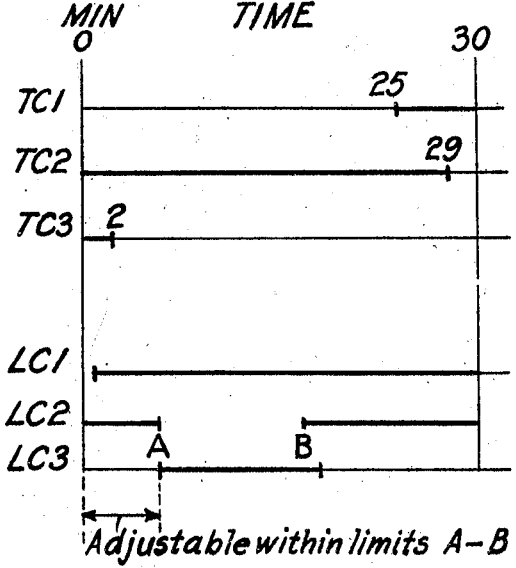

Contacts TC1, TC2 and TC3 are operated by the cam TC on the shaft 98T to close at the time shown in Figure 11. Near the end of the resetting operation contacts TC3 will be closed but no circuit can be completed through them owing to the energisation of the relay RT3 which opens its contacts RT3a. When the relay RT3 is de-energized, a circuit is completed through the contacts TC3 and the contacts RT3a to energise a relay TC3R. At this time contacts TV2b are open since a relay TV2 is normally energised. The relay TC3R will open the contacts TC3Rb so as to open the shunt circuit about itself. At this point it should be noted that the relay TC3R cannot be energised during the synchronizing signal since the contacts TV2b will then be closed owing to the de-energisation of the relay TV2 and will short-circuit the coil TC3R.

The coil TC3R will energise when or while the coil TV2 is energised and will close its contacts TC3Ra to prepare for a start as soon as the next synchronizing signal is received. This signal de-energises the coil TV2 so that its contacts TV2a can close and a circuit will be completed through the contacts MFRa and TV2a and TC3R to energise a coil RT2. This coil closes its contacts RT2a so as to complete a circuit through contacts TC2 which are now closed and a coil RT1. The coil RT1 closes its contacts RT1a to provide a circuit through the contacts MFRa which will maintain the relay RT2 energised. The relay RT1 will close contacts RT1c to provide a circuit including the now closed contacts MFRc, a line 204 (Figs. 1b and 1a) and a relay coil MMR. This coil closes contacts MMRa to connect the meter motor MM in circuit so that the shaft 39 and cams 40 start in operation. This brings the controlling apparatus into operation. The contacts RT2b (Fig. 1c) also open to de-energise a red lamp 135 which was previously illuminated to indicate that the control apparatus was not in operation. One of the cams 40 on the shaft 39 operates to close cam contacts SFC during the greater part of each half-minute cycle but allows them to open momentarily for a short time in each cycle. Contacts SFC thus energise a relay SFR which opens its contacts SFRa but allows them to close momentarily once in each half-minute cycle. This relay also has a mercury switch SFRb which continuously tends to open under delayed action but which is closed when the coil SFR is energised. When this coil is de-energised momentarily, the contacts SFRb will commence to open but will be unable to do so before the relay SFR is re-energised so that a circuit can be completed through the contacts SFRa and SFRb to energise a solenoid TD. The core 143 of this solenoid is pulled down by a spring so that an insulating member 145 shifts the contacts TDa and TDb to the position shown in Figure 1c. When the solenoid TD is energised, it lifts its core and allows contacts TDa and TDb to shift. The downward movement of the core 143 is delayed by a clockwork or other device 146 so it takes two minutes for the core to reach the position shown. While the motor MM (Figure 1a) is in operation, the magnet SFR will be de-energised once in each half-minute cycle and the solenoid TD will be energised once in each half-minute cycle so that the core 143 will never reach its bottom position and the contacts TDa will remain closed and the contacts TDb shifted. When, however, the motor MM is stopped the solenoid TD will not be energised so that the contacts TDa and TDb will be shifted back to the position shown in Figure 1c after an interval of two minutes from the last energisation of the solenoid TD, that is between one-and-a-half and two minutes from the time at which the motor stopped. The purpose of the contacts SFRb is to interrupt the circuit to the solenoid TD if the cam 40 should stop in such position that the contacts SFC are open, the coil SFR de-energised and the contacts SFRa closed. Under these conditions contacts SFRb will open to de-energise the solenoid TD.

The contacts TDb will thus be shifted from the position shown and will complete a circuit to a green light 136 and open the circuit to the amber light 134. There is, however, an alternative circuit to the amber light 134 through contacts SSc closed intermittently by one of the cams 40 so that the amber light will flicker. The red light will be extinguished owing to the opening of the contacts RT2b. The combination of a green light and a flickering amber light shows that the apparatus is in operation but that the double switch 132, 133 is in its start position. This switch is then opened and, by its blade 133, extinguishes the amber light leaving the green light illuminated to show that the apparatus is operating automatically.

The opening of the switch 132 leaves the relay coil MFR energised over a circuit through contacts TV2c closed by the relay TV2, the contacts TDa which are now closed and contacts MFRb which are closed by the coil. When the shaft 98L (Figure 1a) commences to move, the contacts LC1 (Figure 1c) are re-closed but the contacts RT1b are open so that the relay RT3 cannot be energised. The apparatus will then operate as previously described until the point B (Figure 10) of the metering period when the cam contacts TC1 close (see Figure 11) and complete a circuit over a line 205 (Figs. 1c and 1a) to energise a relay coil TC1R. This coil shifts the contacts TC1Ra, TC1Rb and TC1Rc, shown in Figure 1a, to alter the nature of the control by the apparatus as previously described.

One minute before the end of the metering period the contacts TC2 open and de-energise the relay RT1. The relay RT1 opens the contacts RT1a to de-energise the relay RT2. The relay RT2 opens the contacts RT2a so as to prevent the re-energisation of the relay RT1 by the closure of the cam contacts TC2 during the resetting operation. The contacts RT2b close to energise the red lamp 135 but the green lamp 136 remains illuminated to show that the apparatus is in operation. The relay RT1 opens contacts RT1c in the circuit of the relay coil MMR (Fig. 1a) so that the latter is de-energised and de-energises the motor MM. The shaft 39 now ceases to rotate. The core 143 of the solenoid TD will now be able to shift the contacts TDa and TDb at the end of from one-and-a-half to two minutes. Further, the contacts RT1b will close and, since the contacts LC1 are now closed (see Figure 11), the coil RT3 will be energised. This coil will close the contacts RT3b (Figure 1c) so as to energise the pull-off magnets 137L and 137T (Fig. 1a) over the line 203, and, through the contacts 138L and 138T, the reset motor RM. The apparatus will then be reset as previously described. Contacts RT1d in parallel with the contacts TC1 will close to maintain the coil TC1R energised so that the apparatus will continue to operate in accordance with its modified form of control until it has been re-started on a new metering period.

When the controlling gear has been reset, the relay TC3R will be energised as explained previously and will close the contacts TC3Ra so that the relay RT2 can be re-energised when the contacts TV2a close on the next synchronizing signal. The apparatus will then re-start as previously explained.

The energisation of the relay TC3R indicates that the apparatus has been reset and is ready to start and it has been assumed that the synchronizing signal occurs when the relay TC3R has been energised and when the apparatus is in its proper starting position. If the apparatus is running slow so that it is taking longer to complete a metering period than it should do, a time will be reached when the synchronizing signal occurs before or while the relay TC3R is being energised. If the synchronizing signal is being received when the relay RT3 is de-energised at the end of the metering period, the contacts TV2b will be closed owing to the controlling relay being de-energised by the synchronizing signal and the relay TC3R will not re-energise until the synchronizing signal has passed. Consequently its contacts TC3Rc will not close during the interval in which the contacts TV2C are allowed to open owing to their controlling coil TV2 being de-energised by the synchronising signal and the relay MFR will be de-energised. It should be mentioned that, if the synchronisation is correct, the relay MFR is maintained energised through the contacts TC3Rc when the contacts TV2c open. The relay MFR is thus de-energised and opens its contacts MFRa to prevent the relay RT2 being energised to re-start the apparatus on the next synchronizing signal, through the contacts TV2a. This relay also opens the contacts MFRc to prevent the relay MMR (Fig. 1a) being energised so that the motor MM cannot re-start. When energised the relay MFR also shifts the contacts MFRd so as to provide a circuit extending from positive through a line 206 (Figs. 1b, 1a and 1c), contacts MFRd, a line 207, contacts RT2c which are closed while the coil RT2 is energised, and a line 208 (Fig. 1b) to the contacts 26 and 102 of the galvanometer G1 and G2. When this relay is de-energised, this circuit is opened so that there can be no automatic control. The contacts MFRd may be connected to the coil CL by a line 209 (Figs. 1a and 1b) and a switch 150 so that this coil is energised to bring about an automatic lowering of the load to the minimum when the relay MFR is de-energised.

Should the synchronizing signal occur before the relay RT3 is de-energized, the operation would be the same except that the relay coil TC3R is energised as soon as the contacts RT3a close. The function of the contacts TV2b is to prevent the relay TC3R energising during a synchronizing signal with the result that the contacts TC3Rc might close and re-establish the circuit of the coil MFR before its contacts MFRb have had time to open.

The relay MFR will also be de-energised if the apparatus is running fast and is making the metering period too short. Under these conditions the apparatus will have to wait in its starting condition for a relatively long period. It will be understood that the motor MM is idle during the resetting and waiting period but is re-started when the apparatus is re-started. If the motor is idle for from one-and-a-half to two minutes, the core 143 of the solenoid TD (Figure 1c) will have reached its bottom position and opened the contacts TDa, thus interrupting the circuit of the coil MFR which will be de-energized and will prevent the apparatus being re-started as previously explained.

In any event if the apparatus does not re-start, the contacts TDb will shift, thus extinguishing the green light. This leaves only the red light 135 illuminated to indicate that the apparatus is not in operation. The apparatus can only be re-started by means of the switch 132, 133, as explained previously.

It will be noted also that the contacts TDa and TDb will shift to the position shown in Figure 1c should the motor MM stop for any reason so that the relay MFR would again be de-energised and re-starting of the apparatus prevented. It will also be noted that the relay MFR would be de-energised if the control gear (Figure 1a) were not properly reset since then the conditions would correspond to the case when the apparatus is running slow.

It has been explained that the contacts MFRd (Figure 1c) shift to energise the relay CL and bring about an automatic lowering of the load if the controlling apparatus stops or fails to start. If the switch 150 (Fig. 1b) is opened, the relay CL will not be energised in these conditions but the contacts MFRd will still interrupt the circuits through the contacts 102, 103 and 104 to the relays CL and CR so that there can be no automatic change in the load and so that it cannot be raised manually owing to the contacts CRa being open. The load can still be lowered manually. The contacts RT2c (Fig. 1c) open as soon as the reset of the controlling apparatus is initiated and remain open until the apparatus is restarted and serve to prevent automatic change of the load or manual raising of the load during this resetting and waiting interval by opening the circuits through the contacts 102—104 to the coils CL and CR. If the switch 150 is opened and a switch 151 is closed, the circuits to the galvanometer contacts of the meter and control bridges will not be interrupted in any way during the waiting intervals or if the apparatus should fail to restart. The relay coil TC1R will have been energised before the reset and will be held energised by the contacts RT1d so that the controlling apparatus will operate to prevent the instantaneous load, represented by the resistance RI (Figure 1a), rising above the available load, represented by the ratio of the resistances RL and RT to one another. As the apparatus is reset, this ratio represents the instantaneous maximum demand so that the load cannot rise above the instantaneous demand. If the apparatus should stop without being reset, the load would be free to fluctuate without restriction, or limited to the minimum value or to the available load depending on the setting of the resistors RL and RT at the time of stoppage.

Figure 14:
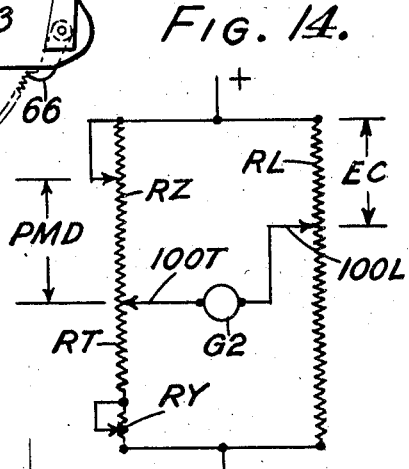
Figure 14 shows a further arrangement of the control bridge.
Figure 15:
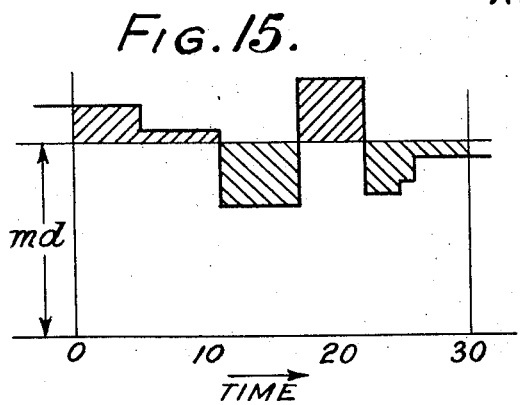
Figures 15 and 16 are diagrams showing load curves during a metering period.
Figure 16:
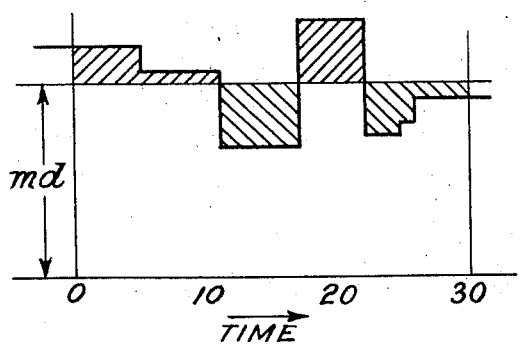

The control bridges shown in Figures 1a and 12 operate in accordance with the available energy, or the equivalent available load, at each point of the metering period. Figure 14 shows a form of control bridge which may be used and which operates in accordance with the energy consumed at each point of the metering period. The resistors RT and RL correspond to the resistors RT and RL of Figure 1a and their moving contacts 100T and 100L are adjusted in the same way as the corresponding moving contacts shown in Figure 1a. The moving contact 100L is initially at the positive (upper) end of the resistor RL and is adjusted at a rate corresponding to the instantaneous load so that the potential drop EC between positive and the moving contact 100L corresponds to the energy consumed to each point in a metering period. The moving contact 100T is adjusted from the positive (upper) end of the resistor RT at a constant rate. The resistor RT is in series with an adjustable resistor RZ and the potential drop PMD across the resistors RZ and RT between positive and the moving contact 100T corresponds, at each point in a metering period, to a partial maximum demand that may be consumed up to the point of the period. The potential drop PMD increases uniformly from an initial minimum value equal to the drop across the resistor RZ to a final value at the end of a metering period when it corresponds to the maximum demand which must not be exceeded. A resistance RY is provided for adjusting the rate of change of the potential drop PMD. The resistor RZ is first adjusted so that the potential drop across is corresponds to a predetermined fraction of the maximum demand such that the remainder of the maximum demand is equivalent to a standard load slightly greater than the instantaneous minimum demand required to maintain the plant in effective operation, and is sufficient to maintain the standard load for the whole of the metering period. The rate of increase of the drop PMD will then correspond to the standard load. The rate of increase of the potential drop EC corresponds to the instantaneous load and the resistor RY is adjusted so that the potential drops PMD and EC increase at the same rate when the instantaneous load is equal to the standard load.

The galvanometer relay G2 is connected between the cursors 100T and 100L and is not energised so long as the potential drops PMD and EC are equal. If the drop PMD is the greater, the relay G2 is energised in one sense and energises the relay CR of Figure 1b so that, as previously explained, the instantaneous load is not restricted. If the potential drop EC is the greater, the relay G2 is energised in the opposite sense and energises the relay CL of Figure 1b. This causes a lowering of the instantaneous load as described previously. At the beginning of each metering period, the potential drop PMD is the greater, since it is the drop across the resistor RZ while the drop EC is zero. The instantaneous load is, thus, initially unrestricted. The load will remain unrestricted so long as the energy consumed does not exceed the instantaneous value of the partial maximum demand. If it does so, the potential drop EC will become the greater and the relay CL will be energised to lower the load until it is equal to the instantaneous minimum demand. The energy consumed will then increase at substantially the same rate as the partial maximum demand until the maximum demand has been consumed at the end of the metering period.

The control bridge just described operates to control the load in the same way as that shown in Figs. 1a and 1b, and the two bridges are equivalent as may be seen by taking a special case. Assume that the moving contact 100T traverses the whole of the resistor RT in one metering period and that the resistor RY is completely short-circuited. The potential drop across the whole bridge will then correspond to the maximum demand. The potential drop between the moving contact 100T and negative will then correspond to the energy equivalent to the instantaneous minimum demand for the rest of the metering period while the potential drop between the moving contact 100L and negative will correspond to the available energy which the plant can consume without exceeding the maximum demand, that is the energy equivalent to the available constant load. The bridge balances when these potential drops are equal, that is, when the available constant load or the equivalent energy equals the instantaneous minimum demand or the equivalent energy which is the condition for balance with the control bridge shown in Figs. 1a and 1b. It is preferred that the total drop across the bridge should exceed the drop corresponding to the maximum demand both to allow of adjustment and because it makes the bridge more accurate near the end of the metering period.

The arrangement shown in Figs 1a and 1b is preferred to that shown in Figure 14, because it is more accurate and less empirical in its operation and because it lends itself to the change of control at the end of the metering period as previously described.

We claim:

1. Apparatus for controlling an electric power-load in an electricity-consuming plant, comprising a device for measuring the energy consumed during each of a succession of metering periods up to each point of each period, means for comparing the energy consumed at each point, or the equivalent constant load, with the energy which it is permissible for the plant to have consumed at that point, or the equivalent constant load, respectively, to determine which is the greater, and control means operable to permit the load to fluctuate so long as the energy consumed, or the equivalent load, is the lesser, but operable to reduce the load at any time in the period when the energy consumed, or the equivalent load, is the greater.

2. Apparatus according to claim 1 in which the permissible energy increases from an initial value, at the beginning of each period, at a uniform rate corresponding to an instantaneous minimum demand by the plant so as to be equal to the maximum demand at the end of the period.

3. Apparatus for controlling an electric power-load in an electricity-consuming plant, comprising a device for measuring the energy consumed during each of a succession of metering periods up to each point of each period, means for subtracting the energy consumed at each point from a permissible maximum demand for the whole of a period to determine the energy still available for consumption at that point, means for comparing the available energy, or the equivalent available load, with the energy that would be consumed during the remainder of the period at a standard load, or the standard load, respectively, to determine which is the greater, and control means operable to permit the load to fluctuate so long as the available energy, or the equivalent available load, is the greater but operable to reduce the load at any time in the period when the available energy, or the equivalent avaialble load, is the lesser.

4. Apparatus according to claim 3, in which the standard load corresponds to an instantaneous minimum demand by the plant.

5. Apparatus for controlling an electric power-load in an electricity-consuming plant, comprising a meter for measuring the energy consumed during each of a succession of metering periods up to each point of each period, means for subtracting the energy consumed at each point from a permissible maximum demand for the whole period to determine the energy still available for consumption at that point, means for comparing the available constant load equivalent to the available energy with a standard load to determine which is the greater, control means operable to permit the load to fluctuate so long as the available load is the greater but operable to reduce the load at any time in the period when the available load is the lesser, and means for preventing the load being reduced by the control means below an instantaneous minimum demand required for effective operation of the plant and slightly less than the standard load.

6. Apparatus for controlling an electric power-load in an electricity-consuming plant, comprising a device for measuring the energy consumed during each of a succession of metering periods up to each point of each period, means for subtracting the energy consumed at each point from a permissible maximum demand for the whole period to determine the energy still available for consumption at that point, a load meter for measuring the instantaneous load taken by the plant at each point of a metering period, means for comparing the available constant load equivalent to the available energy, or the available energy, with the instantaneous load, or the equivalent energy, respectively, to determine which is the greater, and control means operable, so long as the available load, or the available energy, is the greater, to permit the instantaneous load to fluctuate, but operable to reduce the instantaneous load at any time in the period when the available load, or the available energy, is the lesser.

7. Apparatus for controlling an electric power-load in an electricity-consuming plant, comprising a device for measuring the energy consumed during each of a succession of metering periods up to each point of each period, means for subtracting the energy consumed at each point from a permissible maximum demand for the whole period to determine the energy still available for consumption at that point, a load meter for measuring the instantaneous load taken by the plant at each point of a metering period, means for comparing the available constant load equivalent to the available energy, or the available energy, with the instantaneous load, or the equivalent energy, respectively, to determine which is the greater, means operable, during a predetermined initial part of each metering period, to bias the comparison to a predetermined extent in favour of the available load, or the available energy, being the greater, and control means operable, so long as the available load, or the available energy, is the greater, to permit the instantaneous load to fluctuate, but operable to reduce the instantaneous load at any time in the period when the available load, or the available energy, is the lesser.

8. Apparatus for controlling an electric power-load in an electricity-consuming plant, comprising a meter for measuring the energy consumed during each of a succession of metering periods up to each point in a first part of each metering period, means for substracting the energy consumed at each point of a period from a permissible maximum demand for the whole period to determine the energy still available at that point, means for comparing the available constant load equivalent to the available energy with a standard load to determine which is the greater, control means operable to permit the load to fluctuate so long as the available load is the greater but operable to reduce the load at any time in the first part of the period when the available load is the lesser, a meter for measuring the instantaneous load, means for registering the available constant load at the end of the first part of a period, and means for comparing the available constant load thus registered with the instantaneous load to determine which is the greater and operable during the remainder of the period to control the control means in such manner that the control means permits the instantaneous load to fluctuate so long as it is less than the available constant load but reduces the instantaneous load when it is the greater.

9. Apparatus for controlling an electric power-load in an electricity-consuming plant, comprising a device for measuring the energy consumed during each of a succession of metering periods up to each point of each period, means for subtracting the energy consumed at each point from a permissible maximum demand for the whole period to determine the energy still available for consumption at that point, a load meter for measuring the instantaneous load taken by the plant at each point of a metering period, means for comparing the available constant load equivalent to the available energy, or the available energy, with the instantaneous load, or the equivalent energy, respectively, to determine which is the greater, means for interrupting the operation of the energy meter at a predetermined point in each metering period whereby the energy it registers remains constant for the remainder of that period, and control means operable, so long as the available load, or the available energy, is the greater, to permit the instantaneous load to fluctuate, but operable to reduce the instantaneous load at any time in the period when the available load, or the available energy, is the lesser.

10. Apparatus for controlling an electric power-load in an electricity-consuming plant, comprising a meter for measuring the energy consumed, means for controlling the load, in accordance with the relationship between the energy registered by the said meter and a permissible maximum demand which the plant may consume in each of a series of metering periods, to reduce the load automatically when the energy registered at any point is becoming excessive, resetting means for re-setting the apparatus at the end of each metering period to a start condition in readiness for another such period, re-starting means operable by an impulse, when the apparatus is in its start condition, automatically to re-start it in operation, and re-start-preventing means operable by the said impulse, when the apparatus is not in the start condition, to render the apparatus incapable of being re-started and to bring into action means for limiting the load to a safe value.

11. Apparatus according to claim 10, comprising means operable, when the apparatus has remained in the start condition for a predetermined time, to bring the restart-preventing means into action.

12. Apparatus for controlling an electric power-load in an electricity-consuming plant, comprising a meter for measuring the energy consumed up to each point in each of a series of metering periods, a first adjustable resistor connected to the meter so as to be adjusted, in accordance with the energy consumed, to have a resistance representing the energy consumed, a second adjustable resistor, means for adjusting the second resistor to increase its resistance at a uniform rate, a polarised relay so connected to said resistors to form a bridge as to be energised in one sense when the energy represented by the first resistor is greater than that represented by the second resistor and control means arranged to be brought into action, when the relay is energised in the said sense, to reduce the load taken by the plant.

13. Apparatus for controlling an electric power-load in an electricity-consuming plant, comprising a meter for measuring the energy consumed during each of a series of metering periods, a resistance-bridge comprising in one arm a resistor adjustable from zero by the meter to have resistance proportional to the energy consumed and in another arm a resistor adjustable from a minimum value other than zero to a maximum value proportional to a permissible maximum demand for one metering period, means for adjusting the second resistor at a uniform rate from its minimum to its maximum resistance during each metering period, a polarised relay connected across the bridge so as to be energised when the first resistor is adjusted to be proportional to more energy than the second, and control means brought into action by the relay, when so energised, to reduce the load taken by the plant.

14. Apparatus for controlling an electric power-load in an electricity-consuming plant, comprising a meter for measuring the energy consumed during each of a series of metering periods, a first adjustable resistor whose total resistance represents a permissible maximum demand for one metering period and which is adjustable by the meter to reduce its resistance in circuit in accordance with the energy consumed, a second adjustable resistor, means for adjusting the second resistor at a uniform rate to reduce its resistance to zero at the end of a period, two further fixed resistors, the ratio of the resistances of which represents a standard load, said four resistors being connected in a bridge to balance when the ratio of the first resistor to the second equals the ratio of the two fixed resistors to one another, a polarised relay connected across the bridge to be energised in one sense when the ratio of the first resistor to the second is less than that of the two fixed resistors to one another, and control means operable by the relay when so energized to reduce the load taken by the plant.

15. Apparatus according to claim 13, comprising a meter for measuring the instantaneous load taken by the plant, a third adjustable resistor adjustable by the load meter so that its resistance in circuit corresponds to the instantaneous load, and means operable at a change-over point towards the end of each metering period to disconnect the first adjustable resistor from the energy meter so that its resistance remains constant for the rest of the period, to replace the second adjustable resistor in the bridge by a fixed resistor and to replace one of the fixed resistors by the third adjustable resistor.

16. Apparatus for controlling an electric power-load in an electricity-consuming plant, comprising a load meter for measuring the load taken instantaneously by the plant, an energy meter for measuring the energy consumed by the plant up to each point of each of a succession of metering periods, a first adjustable resistor whose maximum resistance represents a permissible maximum demand for one metering period and which is adjustable by the energy meter from its maximum resistance at the beginning of each period to reduce its resistance in accordance with the energy consumed, a second adjustable resistor, means for reducing the resistance of the second resistor from its maximum at the beginning of each period at a uniform rate to zero at the end of the period, a fixed resistor, a third adjustable resistor adjustable by the load meter in such manner that the ratio of its resistance to that of the fixed resistor corresponds to the instantaneous load taken, said four resistors being connected in a bridge in such manner that the bridge is balanced when the ratio of the first to the second adjustable resistor equals that of the third adjustable resistor to the fixed resistor, a polarised relay connected across the bridge so as to be energised in one sense when the first ratio is less than the second ratio, and control means operable by the relay, when it is so energised to reduce the load taken by the plant.

17. Apparatus according to claim 16, comprising means operable at a change-over point towards the end of each metering period to disconnect the first adjustable resistor from the energy meter so that its resistance remains constant for the remainder of the period and to replace the second adjustable resistor by a fixed resistor.

18. Apparatus for controlling an electric power-load in an electricity-consuming plant comprising a meter having a part rotatable to an extent in each of a series of intervals of time proportional to the average load taken by the plant in that time and operable to generate in each interval a number of impulses proportional to the extent of its movement in that interval, two adjustable resistors connected to form a bridge, a separate impulse-operated stepping device for each adjustable resistor of which one is operable by the impulses generated by the said part of the meter to adjust its resistor in steps, means for applying impulses at a uniform rate to the other stepping device to cause it to adjust its resistor in steps at a uniform rate, a polarised relay connected across the bridge to be energised in accordance with the state of balance of the bridge, and control means operable by the relay to permit the load taken to vary or to reduce it in accordance with the manner in which the relay is energised.

19. Apparatus for regulating an electric power-load, comprising automatic control means which is adjustable to either an "unrestricted" or a "restricted" condition, a manual control device and two regulators which are each arranged to regulate a different part of the load and which so control one another and are so controlled by the automatic control means and the manual control device that one is brought into action to raise its part of the load up to a maximum when the automatic control means is in its "unrestricted" condition and to be brought into action to lower its part of the load down to a minimum when the automatic control means is in the "restricted" condition and the other part of the load is above a predetermined load, and that the other is brought into action to lower its part of the load by the manual control device or by the automatic control means when it is in the "restricted" condition and when that part of the load exceeds a predetermined load, and is brought into action to raise its part of the load by the manual control means if its part of the load is less than a predetermined load or by the automatic control means when it is in the "unrestricted" condition and the other part of the load has its maximum value.

20. Apparatus according to claim 18 in which the automatic control means comprises two pairs of "raise" contacts closed when the said means is in its "unrestricted" condition and two pairs of "lower" contacts closed when the said means is in its "restricted" condition of which contacts one "lower" pair is connected in a circuit by which the first regulating device is energised to lower the load and which also includes, in series, contacts that are closed only so long as the part of the load controlled by the other regulating device exceeds a predetermined load, one "raise" pair is connected in a circuit by which the first regulating device is energised to raise its part of the load, the other pair of "lower" contacts are connected in a circuit by which the second regulating device is energised to lower its part of the load and which also includes contacts that are closed when the latter part of the load exceeds a predetermined load, and the second "raise" pair are connected in circuit by which the second regulating device is energised to raise its part of the load and which includes, in series, contacts that are closed when the other part of the load is a maximum, and in which the manual or other control device is constituted by a switch adjustable either to complete a third circuit in parallel with the first (lower) circuit to the second regulating device to make a connection to the second (raise) circuit of that device and to a fourth circuit in parallel with the second circuit and including contacts that are closed only when the part of the load controlled by the second regulating device is below a predetermined load.

HENRY COATES.
     BERNARD ANDRÉ VUILLE.